(12) United States Patent
Gutnik et al.

(10) Patent No.: US 7,571,359 B2
(45) Date of Patent: Aug. 4, 2009

(54) CLOCK DISTRIBUTION CIRCUITS AND METHODS OF OPERATING SAME THAT USE MULTIPLE CLOCK CIRCUITS CONNECTED BY PHASE DETECTOR CIRCUITS TO GENERATE AND SYNCHRONIZE LOCAL CLOCK SIGNALS

(75) Inventors: Vadim Gutnik, Austin, TX (US); Anantha Chandrakasan, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1783 days.

(21) Appl. No.: 09/919,372

(22) Filed: Jul. 31, 2001

(65) Prior Publication Data

US 2002/0049936 A1  Apr. 25, 2002

Related U.S. Application Data

(60) Provisional application No. 60/221,709, filed on Jul. 31, 2000.

(51) Int. Cl.
*G06K 5/04* (2006.01)

(52) U.S. Cl. ................................................ 714/700

(58) Field of Classification Search ............... 714/769, 714/700, 707, 738, 798, 799, 812, 814, 699; 713/500, 503, 400; 365/233; 327/158; 375/371
See application file for complete search history.

(56) References Cited

U.S. PATENT DOCUMENTS

| | | | | |
|---|---|---|---|---|
| 3,518,472 A | * | 6/1970 | O'Callaghan | 310/95 |
| 4,479,216 A | * | 10/1984 | Krambeck et al. | 714/814 |
| 5,146,585 A | * | 9/1992 | Smith, III | 713/400 |
| 5,329,251 A | * | 7/1994 | Llewellyn | 331/2 |
| 5,389,897 A | * | 2/1995 | Gebara | 331/1 R |
| 5,552,750 A | * | 9/1996 | Barrett et al. | 331/25 |
| 5,577,075 A | | 11/1996 | Cotton et al. | 375/356 |
| 5,586,307 A | | 12/1996 | Wong et al. | 395/551 |
| 5,638,410 A | * | 6/1997 | Kuddes | 375/357 |
| 5,644,743 A | * | 7/1997 | Barrett et al. | 375/375 |
| 5,696,953 A | | 12/1997 | Wong et al. | 395/560 |
| 5,726,607 A | * | 3/1998 | Brede et al. | 331/2 |
| 5,757,857 A | * | 5/1998 | Buchwald | 375/271 |
| 5,764,710 A | * | 6/1998 | Cheng et al. | 375/371 |
| 5,940,608 A | * | 8/1999 | Manning | 713/503 |

(Continued)

OTHER PUBLICATIONS

Anceau, Francois; *A Synchronous Approach for Clocking VLSI Systems*; IEEE Journal of Solid-State Circuits; vol. SC-17, No. 1; Feb. 1982; pp. 51-56.

(Continued)

*Primary Examiner*—Phung M Chung
(74) *Attorney, Agent, or Firm*—Myers Bigel Sibley & Sajovec, P.A.

(57) ABSTRACT

Multiple clock circuits are connected by phase detector circuits to generate and synchronize local clock signals. For example, a clock distribution circuit includes a first clock circuit that is configured to generate a first clock signal in response to a first error signal, and a second clock circuit that is configured to generate a second clock signal in response to the first error signal. A first phase detector circuit connects the first clock circuit to the second clock circuit and is configured to generate the first error signal in response to the first and the second clock signals.

18 Claims, 4 Drawing Sheets

U.S. PATENT DOCUMENTS

| | | | | |
|---|---|---|---|---|
| 6,058,152 | A * | 5/2000 | Tanishima | 375/376 |
| 6,285,172 | B1 * | 9/2001 | Torbey | 323/237 |
| 6,300,807 | B1 * | 10/2001 | Miyazaki et al. | 327/158 |
| 6,323,910 | B1 * | 11/2001 | Clark, III | 348/537 |
| 6,324,485 | B1 * | 11/2001 | Ellis | 702/117 |
| 6,340,904 | B1 * | 1/2002 | Manning | 327/156 |
| 6,510,013 | B1 * | 1/2003 | Oshio | 360/32 |
| 6,516,422 | B1 * | 2/2003 | Doblar et al. | 713/503 |
| 6,707,863 | B1 * | 3/2004 | Mrozek et al. | 375/327 |
| 6,801,989 | B2 * | 10/2004 | Johnson et al. | 711/167 |
| 6,822,925 | B2 * | 11/2004 | Van De Graaff | 365/233 |
| 2002/0031199 | A1 * | 3/2002 | Rolston et al. | 375/356 |

OTHER PUBLICATIONS

Antonova et al.; *Simulation of SONET/SDH Synchronization Networks*; 18$^{th}$ Biennial Symp on Communication; Kingston, Ontario, Canada; Queen's University, Jun. 1996; pp. 91-94.

Gutnik et al.; *Active GHz Clock Network Using Distributed PLLs*; IEEE Journal of Solid-State Circuits; vol. 35, No. 11; Nov. 2000; pp. 1553-1560.

Kihara et al.; *Steady-State clock Phase Behavior in Loosely Coupled Master-Slave Synchronization Network*; Electronics and Communications in Japan, Part 1 (Communication); vol. 68, Part 12; Dec. 1985; pp. 104-112.

Pham, Dac; *3.0W 75SPECint92 85SPECfp92 Superscalar RISC Microprocessor*; 41$^{st}$ International Solid-State Circuits Conf; San Francisco, CA; IEEE, (CAT No. 94CH3410-8); Feb. 1994; pp. 212-213.

Pratt, et al.; *Distributed Synchronous Clocking*; IEEE Transactions on Parallel and Distributed Systems; vol. 6, No. 3; Mar. 1995; pp. 314-328.

Ricchiuti et al.; *Output Slave Clock Short Term Stability on SDH Equipment*; European Transactions on Telecommunications AEI; vol. 8, Part 2; Mar.-Apr. 1997; pp. 155-159.

\* cited by examiner

CLOCK DISTRIBUTION CIRCUITS AND METHODS OF OPERATING SAME THAT USE MULTIPLE CLOCK CIRCUITS CONNECTED BY PHASE DETECTOR CIRCUITS TO GENERATE AND SYNCHRONIZE LOCAL CLOCK SIGNALS

RELATED APPLICATION

This application claims the benefit of U.S. Provisional Application No. 60/221,709, filed Jul. 31, 2000, the disclosure of which is hereby incorporated herein by reference.

BACKGROUND OF THE INVENTION

The present invention relates generally to the field of electronic clocks, and, more particularly, to distribution of an electronic clock in an electronic circuit, such as an integrated circuit.

The clock distribution network of a microprocessor may use a significant fraction of the total chip power and may have a substantial impact on the overall performance of the microprocessor. For example, the 72-Watt, 600 MHz Alpha processor dissipates approximately 16 Watts in global clock distribution, and another 23 Watts in generating local clocks. Thus, more than half of the Alpha processor's power is used in driving the clock network. Moreover, the uncertainty in a global clock signal may be approximately 10% of the clock period. This may translate into an approximately 10% reduction in maximum operating speed.

Modern microprocessors may use a balanced tree to distribute the clock. Because the delays to all nodes may be nominally equal, a balanced tree may be expected to exhibit relatively low skew. At gigahertz clock speeds, however, an increasing fraction of skew and jitter may come from random variations in gate and interconnect delay. Typically, a relatively large amount of jitter in a clock tree is introduced by buffers and inter-line coupling to the clock wires, and a relatively small amount of jitter may come from noise in the source oscillator. Therefore, conventional clock designs may focus on matching the delay along the various clock paths. As clock speed increases, however, the signal delay across a chip may become comparable to a clock cycle. Because the error in a global clock generally increases in conjunction with an increase in the total path delay, the global clock error may constitute a relatively large fraction of the global clock cycle. Accordingly, there exists a need for improved clock distribution circuits and methods of operating same.

SUMMARY OF THE INVENTION

Embodiments of the present invention provide clock distribution circuits, systems, and methods of operating same that use multiple clock circuits that are connected by phase detector circuits to generate and synchronize local clock signals. For example, in some embodiments, a clock distribution circuit comprises a first clock circuit that is configured to generate a first clock signal in response to a first error signal, and a second clock circuit that is configured to generate a second clock signal in response to the first error signal. A first phase detector circuit connects the first clock circuit to the second clock circuit, and is configured to generate the first error signal in response to the first and the second clock signals.

In other embodiments of the present invention, a third clock circuit is configured to generate a third clock signal in response to a second error signal, and a second phase detector circuit connects the first clock circuit to the third clock circuit. In addition, the second phase detector circuit generates the second error signal in response to the first and the third clock signals, and the first clock circuit is further configured to generate the first clock signal in response to the first and the second error signals.

By using multiple clock circuits to generate local, synchronized clock signals, chip-length clock lines that may couple in jitter may be avoided. Moreover, skew may be limited to that resulting from asymmetries in one or more phase detector circuits instead of mismatches in physically separated buffers. Because the clock signal is regenerated at each clock circuit, high-frequency jitter may not accumulate with distance from the clock source.

In other embodiments of the present invention, the first clock circuit comprises a loop filter circuit, which is configured to generate a control signal at an output terminal thereof in response to the first and the second error signals, and an oscillator that is configured to generate the first clock signal in response to the control signal.

In other embodiments of the present invention, the first clock circuit further comprises a summation circuit that is configured to add the first and the second error signals to generate a composite error signal. The loop filter circuit is further configured to generate the control signal in response to the composite error signal.

In still other embodiments of the present invention, the loop filter circuit comprises a first amplifier circuit and a second amplifier circuit that are connected at the output terminal of the loop filter circuit and are both responsive to the composite error signal.

In still other embodiments of the present invention, the first phase detector circuit comprises a first pulse generator circuit that is configured to generate a first pulse signal in response to the first clock signal, and a second pulse generator circuit that is configured to generate a second pulse signal in response to the second clock signal. The first phase detector circuit further comprises an arbiter circuit that is configured to generate the first error signal in response to the first pulse signal and the second pulse signal.

Although described above primarily with respect to apparatus/device aspects of the present invention, it should be understood that the present invention may also be embodied as systems and methods for distributing a clock signal.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
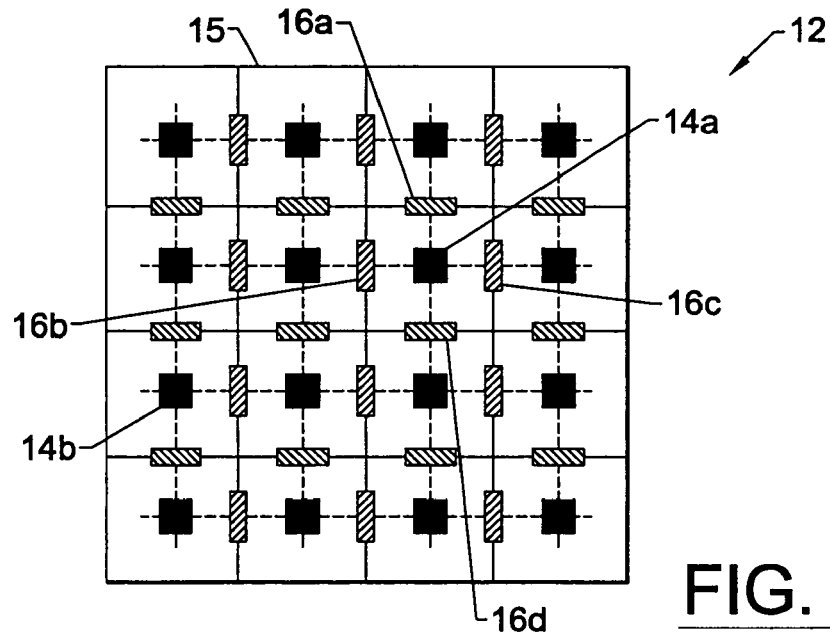
FIG. 1 is a block diagram that illustrates clock distribution circuits in accordance with embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like reference numbers signify like elements throughout the description of the figures.

Referring now to FIG. 1, a clock distribution circuit 12, in accordance with embodiments of the present invention, comprises an array of phase locked loop circuits (PLLs). More specifically, independent clock circuits 14 (e.g., 14*a* and 14*b*) may generate substantially synchronized clock signals at multiple nodes across an integrated circuit device 15 with each clock circuit distributing its clock signal to only a small section (e.g., a tile) of the device. Each of the phase detector circuits 16 (e.g., 16*a*, 16*b*, 16*c*, and 16*d*) connects one of the clock circuits 14 to another one of the clock circuits 14 and generates an error signal that is used to adjust the frequencies of the clock signals generated by the connected clock circuits. Although the clock distribution circuit 12 is shown in FIG. 1 in a square configuration in which each clock circuit is connected to four other clock circuits through four separate phase detector circuits, it will be understood that the clock circuits 14 may be connected in other geometric arrangements in accordance with embodiments of the present invention.

When configuring the clock circuits 14 and the phase detectors 16 in the clock distribution circuit 12, both small-signal and large-signal performance may be considered. As used herein, small-signal refers to the state in which the phase differences between the clock signals generated by the clock circuits 14 are relatively small, and the clock circuits 14 can converge to a lock state in which the clock signals are substantially in phase with one another. Conversely, large-signal refers to the state in which the phase difference between two or more clock circuits is relatively large, and the clock circuits 14 may be susceptible to a phenomenon called "mode lock" in which the clock signals are not in phase with one another, but nevertheless have a net phase error of approximately zero. In general, small-signal noise performance may be enhanced by increasing the number of connections between the clock circuits 14 through the phase detectors 16. With regard to large-signal performance, G. A. Pratt and J. Nguyen have shown in their paper entitled "Distributed synchronous clocking," IEEE Trans. Parallel and Distributed Systems, March 1995, the disclosure of which is hereby incorporated herein by reference, that for a system in mode-lock, there must be a phase difference $\theta$ between two clock circuits such that $\theta \geq 2\pi/n$, where n is the number of nodes in the largest minimal loop in the network. A minimal loop is defined as a loop that cannot be decomposed into multiple loops. A detailed mathematical treatment of both small-signal and large-signal performance of exemplary clock distribution circuits 12, in accordance with embodiments of the present invention, is provided in an article by the present inventors, V. Gutnik and A. Chandrakasan, entitled "Active GHz Clock Network Using Distributed PLLs," IEEE Journal of Solid-State Circuits, November 2000, the disclosure of which is hereby incorporated herein by reference.

Figure 2:
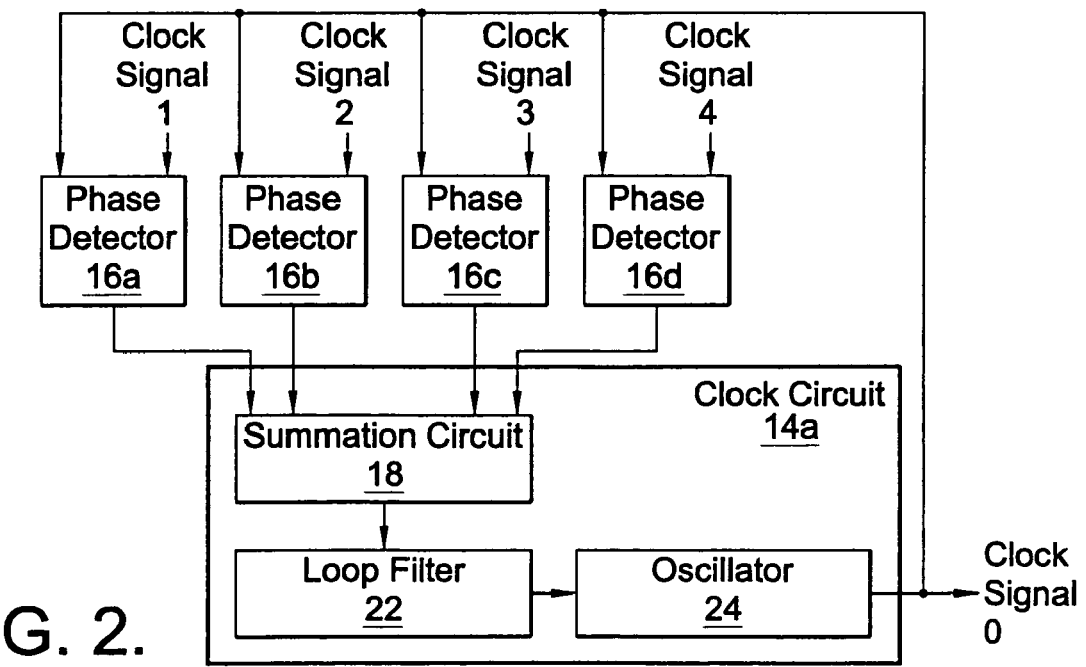
FIG. 2 is a block diagram that illustrates clock circuits and phase detector circuits in accordance with embodiments of the present invention.

An exemplary embodiment of a clock circuit, such as the clock circuit 14*a* of FIG. 1, in accordance with the present invention, is shown in more detail in FIG. 2. It will be understood, however, that other clock circuit embodiments may also be used. The clock circuit 14*a* comprises a summation circuit 18, a loop filter circuit 22, and an oscillator 24 that are configured as shown. The summation circuit 18 is configured to generate a composite error signal by adding the error signals from the four phase detector circuits 16*a*, 16*b*, 16*c*, and 16*d*. The loop filter circuit 22 generates a control signal in response to the composite error signal, which is used by the oscillator 24 to adjust the frequency of the clock signal 0 output from the oscillator 24. The clock signal 0 that is output from the clock circuit 14*a* is fed back to the four phase detector circuits 16*a*, 16*b*, 16*c*, and 16*d*, which generate respective error signals based on the phase difference between the clock signal 0 and the clock signals 1, 2, 3, and 4 generated by neighboring clock circuits 14 in the clock distribution circuit 12.

Figure 3:
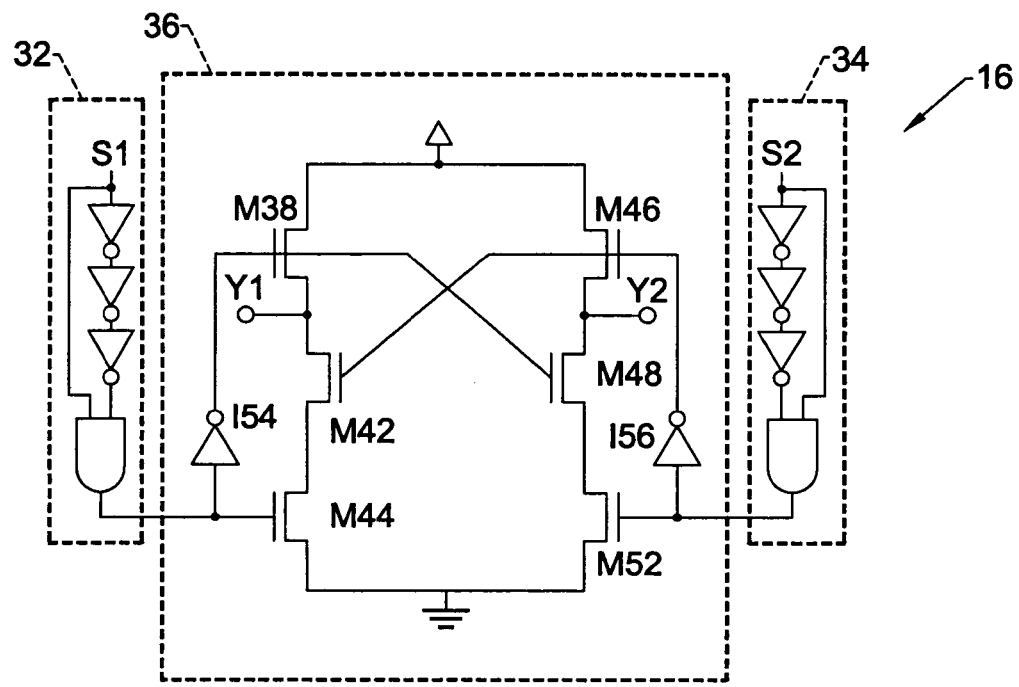
FIG. 3 is a circuit schematic that illustrates phase detector circuits in accordance with embodiments of the present invention.

FIG. 3 illustrates a phase detector circuit, such as the phase detector circuit 16 of FIG. 2, in accordance with embodiments of the present invention, that may provide sufficient nonlinearity, relatively high gain for small differences in input signal phase, and improved noise performance at high frequencies. It will be understood, however, that other phase detector circuit embodiments may also be used. The phase detector circuit 16 may also detect large frequency differences between signals. As shown in FIG. 3, the phase detector circuit 16 comprises a first pulse generator circuit 32 and a second pulse generator circuit 34 that are connected to an arbiter circuit 36. The first pulse generator circuit 32 comprises a logic circuit that is configured as shown and receives an input signal Si at an input terminal thereof and generates a first pulse signal in response thereto. Similarly, the second pulse generator circuit 34 comprises a logic circuit that is configured as shown and receives an input signal S2 at an input terminal thereof and generates a second pulse signal in response thereto.

Figure 4:
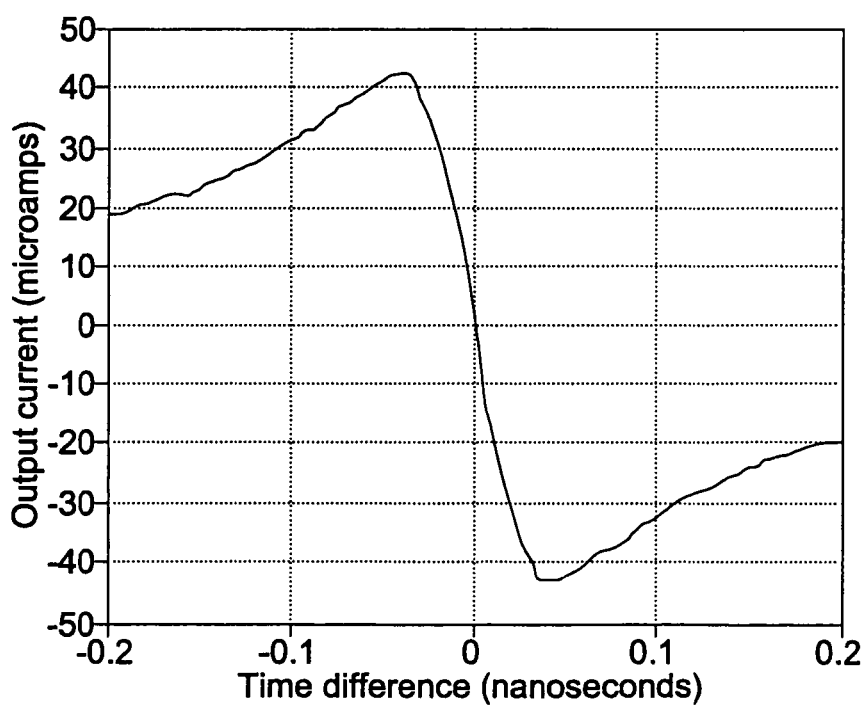
FIG. 4 is a graph of output current versus input signal phase difference for phase detector circuits in accordance with embodiments of the present invention.

The NMOS-loaded arbiter circuit 36 comprises transistors M38, M42, M44, M46, M48, and M52, and inverters I54 and I56, which act as a nonlinear phase detector. Transistor M44 and the inverter I54 receive the first pulse signal generated by the first pulse generator circuit 32. Transistor M52 and the inverter I56 receive the second pulse signal generated by the second pulse generator circuit 34. When there is input phase difference between the signals S1 and S2, the outputs at terminals Y1 and Y2 are substantially balanced. As the phase difference between signals S1 and S2 increases from zero, one output will be asserted for the full duration of an input pulse, while the other output will be asserted for only the remainder of the input pulse duration after the first input pulse ends, which is equal to the phase difference between signals S1 and S2. Thus, the detector may provide relatively high gain near zero phase error, but the gain may approach zero as the input phase difference approaches the input pulse width as shown in FIG. 4.

Figure 5:
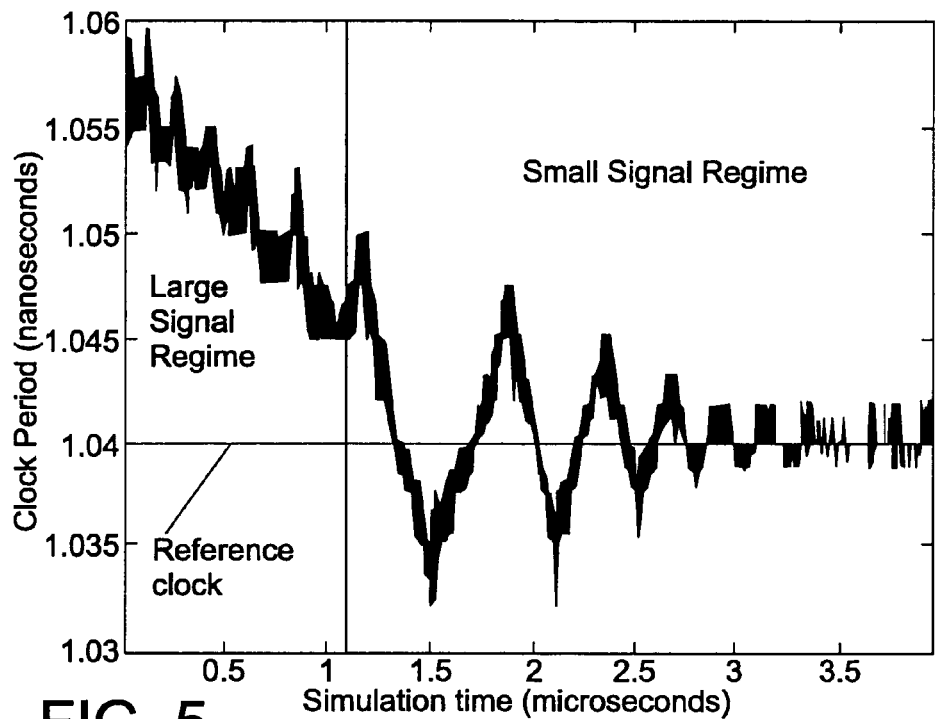
FIG. 5 is a graph that illustrates clock signal convergence for clock distribution circuits in accordance with embodiments of the present invention.

The pulse generators 32 and 34 shown in FIG. 3 may enable the arbiter circuit 36 to provide frequency error feedback. That is, if one input signal is at a higher frequency than the other, then its output will be asserted for more input pulses than the other. Because the width of the pulses is independent of input frequency, the average output voltage corresponds to frequency. Unlike a conventional phase-frequency detector, however, the strength of the error signal falls to approximately zero as the frequency difference approaches zero. Because the gain is relatively high near zero phase error and approaches zero as the input phase difference approaches the input pulse width, mode-lock problems may be avoided and large signal phase-locking may be enhanced. FIG. 5 shows the large-signal and small-signal behavior of an array of clock circuits 14 as the clock signals generated by these clock circuits 14 are synchronized with a reference clock. A phase detector may consume a space on a chip of approximately 30 μm×30 μm.

Figure 6:
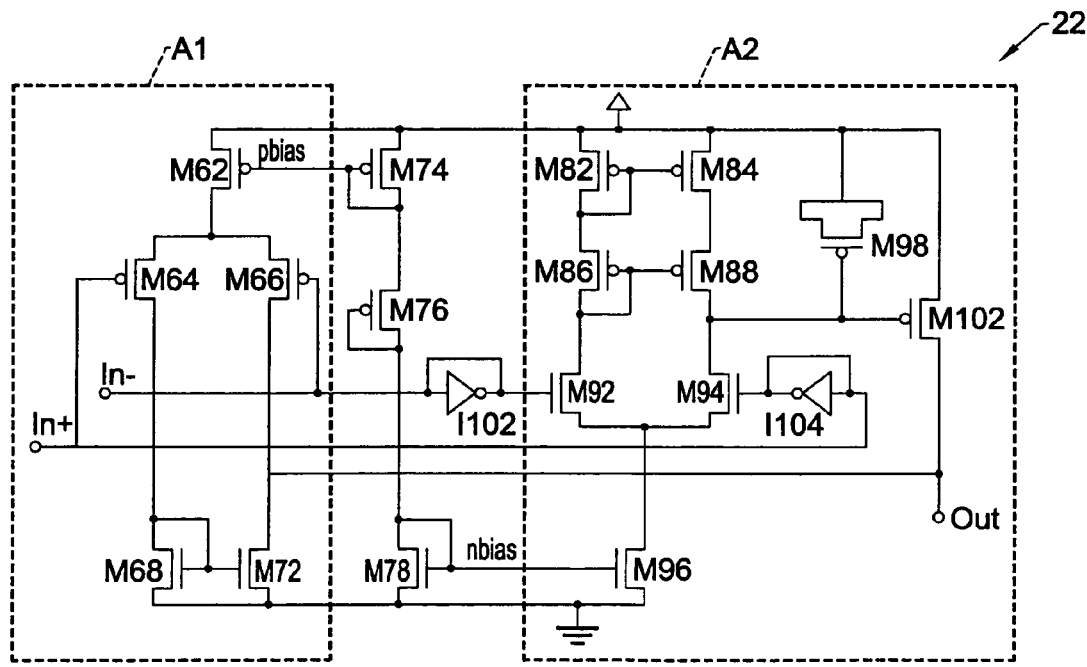
FIG. 6 is a circuit schematic of loop filter circuits in accordance with embodiments of the present invention.

As discussed hereinabove with respect to FIG. 2, each clock circuit 14 may comprise a loop filter circuit 22 that generates a control signal for an oscillator 24. Conventional loop filters may use a charge pump with an RC pole-zero pair and may place the capacitor and resistor off chip. To avoid the series resistor of a charge pump with passive RC compensation, a feed-forward compensation method may be used. As shown in FIG. 6, a loop filter circuit, such as the loop filter circuit 22 of FIG. 2, in accordance with embodiments of the present invention, comprises two differential amplifiers A1 and A2. Amplifier A1 comprises transistors M62, M64, M66, M68, and M72. Amplifier A2 comprises transistors M82, M84, M86, M88, M92, M94, M96, M98, and M102. It will be understood, however, that other embodiments of loop filter circuits may also be used. Transistors M74, M76, and M78 are used for biasing the two amplifiers A1 and A2. Inverters I102 and I104 are connected to the gate terminals of transistors M92 and M94, respectively. The differential output currents from the phase detector circuits 16 that are connected to the clock circuit 14 are summed by the summation circuit 18 and provided to nodes In+ and In−, which drive both amplifiers A1 and A2. Amplifier A1 is a single stage differential pair so it may have a relatively low gain, but its bandwidth may be limited by $g_m/C_{gs}$, where $g_m$ is the transconductance of the transistors.

Amplifier A2 includes a high gain cascaded stage driving a common source PFET M102. Transistor M98 is a large gate capacitor, which serves to set the dominant pole of the amplifier A2 such that the stability of the PLL circuit comprising the clock circuit 14 and one or more phase detector circuits 16 may be enhanced. Transistor M96 may be biased at relatively low current to boost gain and to provide a low time constant (e.g., 12 kHz) with a 15 μm×15 μm gate capacitor. The loop filter design and feed-forward compensation may allow the loop filter to fit in a space of 15 μm×45 μm. Each clock circuit 14, comprising a summation circuit 18, a loop filter circuit 22, and an oscillator 24 may consume a space on a chip of approximately 45 μm×45 μm.

Figure 7:
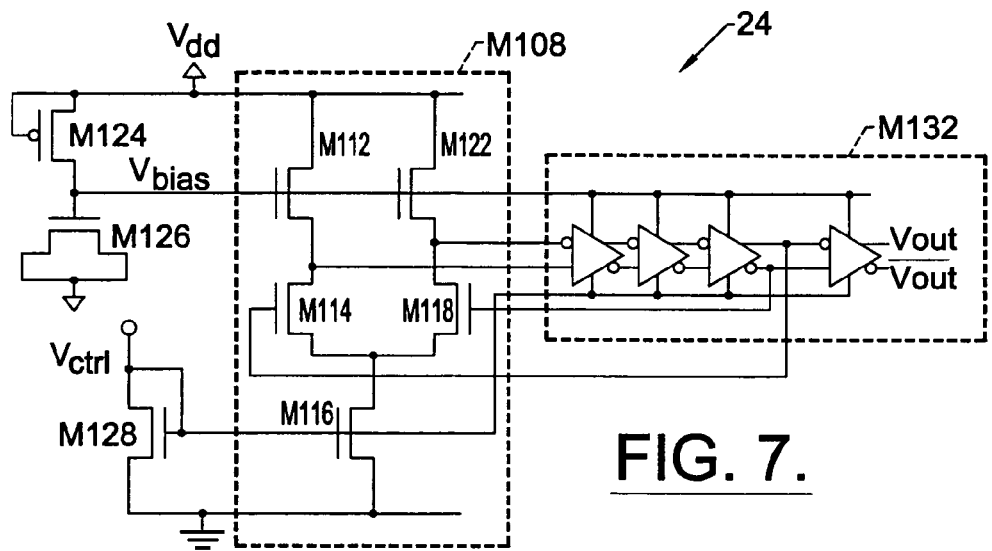
FIG. 7 is as circuit schematic of oscillators in accordance with embodiments of the present invention.

One metric that may be used in the design of oscillator circuits for clock generation is jitter. Moreover, power supply noise may be a primary contributor to jitter. Accordingly, the oscillator 24 may be designed to reduce the effects of power supply noise. As shown in FIG. 7, an oscillator, in accordance with embodiments of the present invention, may use an NMOS-loaded differential ring oscillator as a voltage controlled oscillator (VCO) to reduce power supply noise. Transistors M112, M114, M116, M118, and M122 comprise a differential inverter M108, which drives an inverter chain M132. Transistors M114 and M118 comprise a differential pair and the tail current is driven by transistor M116. The control signal Vctrl, which is output from the loop filter circuit 22, is received at the drain terminal of the transistor M128 and the gate terminal of the transistor M116. Transistors M112 and M122 act as the NMOS load. The NMOS load may allow fast oscillation and may shield the output signal from noise from the power supply Vdd. The voltage Vbias is a low-pass version of Vdd generated by subthreshold leakage through the PFET M124. Supply noise, which may be coupled in through the gate to drain capacitance ($C_{gd}$) of transistors M112 and M122 may be bypassed by transistor M126. Advantageously, Vbias may have reduced noise at high frequencies. The oscillation frequency may be dependent on the supply voltage and Vbias through capacitor non-linearity. The feedback of the PLL (i.e., a clock circuit 14 and one or more phase detector circuits 16) may compensate for slow frequency variations that may be caused by variations in the supply voltage.

Experimental Results

Figure 8:
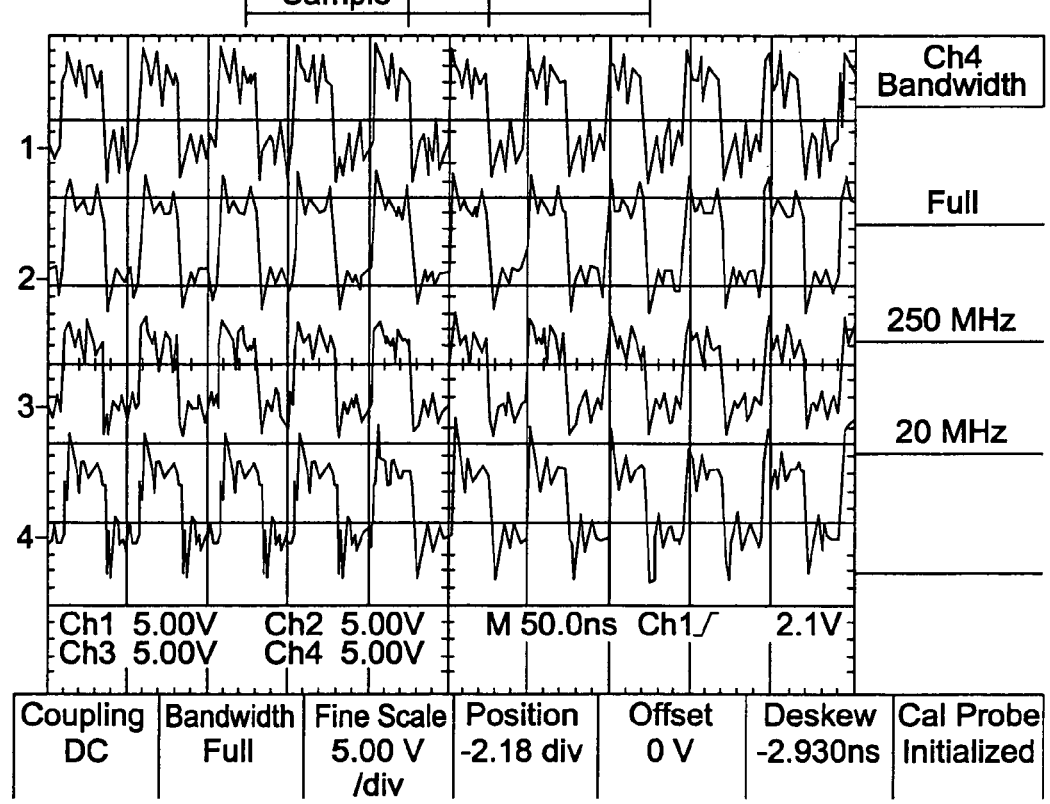
FIG. 8 is an oscilloscope graph of clock signals generated by clock distribution circuits in accordance with embodiments of the present invention.

The following experimental results are provided as an example and shall not be construed as limiting the present invention. An experimental chip has been fabricated with a 4×4 array of nodes (i.e., clock circuits 14) and a phase detector circuit 16 between nearest neighbors. Counting one clock circuit 14 and two phase detector circuits 16, the area overhead is approximately 0.0038 mm² per tile. A phase detector circuit 16 placed between one of the nodes and the chip clock input locks the clock distribution network to an external reference. The respective outputs of the 16 oscillators 24 are divided by 64 and driven off chip. At VDD=3V, the divided outputs achieve frequency lock at approximately 17 MHz-21 MHz, corresponding to oscillator phase lock at approximately 1.1 GHz-1.3 GHz. An oscilloscope plot of four locked output signals is shown in FIG. 8. Long-term jitter between neighboring tiles is less than approximately 30 picoseconds rms. Cycle-to-cycle jitter is less than approximately 10 picoseconds. The oscillators, amplifiers, and biasing circuitry draw approximately 130 mA at 3V.

From the foregoing it can readily be seen that clock distribution circuits, in accordance with embodiments of the present invention, may provide a distributed clock network in which the clock signal is regenerated at each node or tile. As a result, chip-length clock lines that may couple in jitter may be avoided. Skew may be limited to that resulting from asymmetries in one or more phase detector circuits instead of mismatches in physically separated buffers. Furthermore, the performance of the clock distribution network may scale with improvements in device speed rather than the generally slower improvements in on-chip interconnect speed.

Many variations and modifications can be made to the preferred embodiments without substantially departing from the principles of the present invention. All such variations and modifications are intended to be included herein within the scope of the present invention, as set forth in the following claims.

We claim:

1. A clock distribution circuit, comprising:
   a first clock circuit that is configured to generate a first clock signal responsive to an error signal received at an input thereof;
   a second clock circuit that is configured to generate a second clock signal responsive to the error signal received at an input thereof; and
   a phase detector circuit that connects the first clock circuit to the second clock circuit and is configured to generate the error signal responsive to the first and the second clock signals.

2. The clock distribution circuit of claim 1, wherein the error signal is a first error signal, wherein the input of the first clock circuit is a first input of the first clock circuit, and wherein the phase detector is a first phase detector, the clock distribution circuit further comprising:
 a third clock circuit that is configured to generate a third clock signal responsive to a second error signal received at an input thereof; and
 a second phase detector circuit that connects the first clock circuit to the third clock circuit and is configured to generate the second error signal responsive to the first and the third clock signals;
 wherein the first clock circuit is further configured to generate the first clock signal responsive to the first and the second error signals, the second error signal being received at a second input of the first clock circuit.

3. The clock distribution circuit of claim 2, wherein the first clock circuit comprises:
 a loop filter circuit that is configured to generate a control signal at an output terminal thereof responsive to the first and the second error signals; and
 an oscillator that is configured to generate the first clock signal responsive to the control signal.

4. The clock distribution circuit of claim 3, wherein the first clock circuit further comprises:
 a summation circuit that is configured to add the first and the second error signals to generate a composite error signal, the loop filter circuit being configured to generate the control signal responsive to the composite error signal.

5. The clock distribution circuit of claim 4, wherein the loop filter circuit comprises:
 a first amplifier circuit that is responsive to the composite error signal; and
 a second amplifier circuit that is responsive to the composite error signal and is connected to the first amplifier circuit at the output terminal.

6. The clock distribution circuit of claim 1, wherein the phase detector circuit comprises:
 a first pulse generator circuit that is configured to generate a first pulse signal responsive to the first clock signal;
 a second pulse generator circuit that is configured to generate a second pulse signal responsive to the second clock signal; and
 an arbiter circuit that is configured to generate the error signal responsive to the first pulse signal and the second pulse signal.

7. The clock distribution circuit of claim 1, wherein the first clock circuit, the second clock circuit, and the phase detector circuit are contained in a single integrated circuit chip.

8. A clock distribution circuit, comprising:
 a plurality of phase detector circuits;
 a plurality of clock circuits, respective ones of the plurality of clock circuits being directly connected to at least one other of the plurality of clock circuits by respective ones of the plurality of phase detector circuits, respective ones of the plurality of phase detector circuits being configured to generate respective ones of a plurality of error signals responsive to respective ones of a plurality of clock signals generated by the respective ones of the plurality of clock circuits that are directly connected thereby, the respective ones of the plurality of clock circuits being configured to generate respective ones of the plurality of clock signals responsive to respective ones of the plurality of error signals that are received at respective inputs thereof and are generated by the respective ones of the plurality of phase detector circuits that directly connect the respective ones of the plurality of clock circuits to the at least one other of the plurality of clock circuits.

9. The clock distribution circuit of claim 8, wherein the plurality of clock circuits comprise:
 a plurality of loop filter circuits, respective ones of the plurality of loop filter circuits being configured to generate respective ones of a plurality of control signals at respective output terminals thereof responsive to the respective ones of the plurality of error signals that are generated by the respective ones of the plurality of phase detector circuits that directly connect the respective ones of the plurality of clock circuits to the at least one other of the plurality of clock circuits; and
 a plurality of oscillator circuits, respective ones of the plurality of oscillator circuits being configured to generate the respective ones of the plurality of clock signals responsive to the respective ones of the plurality of control signals.

10. The clock distribution circuit of claim 9, wherein the plurality of clock circuits further comprise:
 a plurality of summation circuits, respective ones of the plurality of summation circuits being configured to generate a plurality of composite error signals, respective ones of the plurality of composite error signals corresponding to summations of the respective ones of the plurality of error signals that are generated by the respective ones of the plurality of phase detector circuits that directly connect the respective ones of the plurality of clock circuits to the at least one other of the plurality of clock circuits, the respective ones of the plurality of loop filter circuits being configured to generate the respective ones of a plurality of control signals responsive to the respective ones of the plurality of composite error signals.

11. The clock distribution circuit of claim 10, wherein the plurality of loop filter circuits comprise:
 a plurality of first amplifier circuits, respective ones of the plurality of first amplifier circuits being responsive to the respective ones of the composite error signals; and
 a plurality of second amplifier circuits, respective ones of the plurality of second amplifier circuits being responsive to the respective ones of the composite error signals, and being connected to the respective ones of the plurality of first amplifier circuits at the respective output terminals.

12. The clock distribution circuit of claim 8, wherein the plurality of phase detector circuits comprise:
 a plurality of first pulse generator circuits, respective ones of the plurality of first pulse generator circuits being configured to generate respective ones of a plurality of first pulse signals responsive to first respective ones of the plurality of clock signals generated by the respective ones of the plurality of clock circuits that are directly connected by the respective ones of the plurality of phase detector circuits;
 a plurality of second pulse generator circuits, respective ones of the plurality of second pulse generator circuits being configured to generate respective ones of a plurality of second pulse signals responsive to second respective ones of the plurality of clock signals generated by the respective ones of the plurality of clock circuits that are directly connected by the respective ones of the plurality of phase detector circuits; and
 a plurality of arbiter circuits, respective ones of the plurality of arbiter circuits being configured to generate the respective ones of the plurality of error signals responsive to the respective ones of the plurality of first pulse signals and to respective ones of the plurality of second pulse signals.

13. The clock distribution circuit of claim 8, wherein the plurality of clock circuits and the plurality of phase detector circuits are contained in a single integrated circuit chip.

14. A method for distributing a clock signal, comprising:

generating a first clock signal using a first clock circuit;

generating a second clock signal using a second clock circuit;

generating an error signal based on a relative phase difference between the first clock signal and the second clock signal;

regenerating the first clock signal using the first clock circuit responsive to the error signal received at an input of the first clock circuit; and regenerating the second clock signal using the second clock circuit responsive to the error signal received at an input of the second clock circuit.

15. The method of claim 14, wherein the error signal is a first error signal, the method further comprising:

generating a third clock signal using a third clock circuit;

generating a second error signal based on a relative phase difference between the first clock signal and a third clock signal; and regenerating the third clock signal using the third clock circuit responsive to the second error signal received at an input of the third clock circuit.

16. The method of claim 15, wherein the input of the first clock circuit is a first input of the first clock circuit and wherein regenerating the first clock signal comprises:

regenerating the first clock signal using the first clock circuit responsive to the first error signal and the second error signal, which is received at a second input of the first clock circuit.

17. The method of claim 16, wherein generating the first clock signal comprises:

summing the first and the second error signals to generate a composite error signal;

filtering the composite error signal to generate a control signal; and regenerating the first clock signal responsive to the control signal.

18. The method of claim 14, wherein generating the error signal comprises:

generating a first pulse signal responsive to the first clock signal;

generating a second pulse signal responsive to the second clock signal; and generating the error signal responsive to the first pulse signal and the second pulse signal.

\* \* \* \* \*

UNITED STATES PATENT AND TRADEMARK OFFICE
CERTIFICATE OF CORRECTION

PATENT NO. : 7,571,359 B2
APPLICATION NO. : 09/919372
DATED : August 4, 2009
INVENTOR(S) : Gutnik et al.

It is certified that error appears in the above-identified patent and that said Letters Patent is hereby corrected as shown below:

Column 9, Claim 14, Line 7: Please correct "A method for distributing a clock signal," to read -- A method of generating clock signals, --.

Signed and Sealed this

Thirteenth Day of October, 2009

David J. Kappos
*Director of the United States Patent and Trademark Office*